US010270293B2

(12) United States Patent
Lenive

(10) Patent No.: US 10,270,293 B2
(45) Date of Patent: Apr. 23, 2019

(54) WIRELESS CHARGER WITH RESONATOR

(71) Applicant: QUALCOMM TECHNOLOGIES INTERNATIONAL, LTD., Cambridge (GB)

(72) Inventor: Vlad Lenive, Cambridge (GB)

(73) Assignee: QUALCOMM TECHNOLOGIES INTERNATIONAL, LTD., San Diego, CA (US)

(*) Notice: Subject to any disclaimer, the term of this patent is extended or adjusted under 35 U.S.C. 154(b) by 710 days.

(21) Appl. No.: 14/446,016

(22) Filed: Jul. 29, 2014

(65) Prior Publication Data

US 2016/0036261 A1 Feb. 4, 2016

(51) Int. Cl.
H02J 7/02 (2016.01)
H02J 50/10 (2016.01)
H02J 50/12 (2016.01)

(52) U.S. Cl.
CPC .............. H02J 50/12 (2016.02); H02J 7/025 (2013.01); H02J 50/10 (2016.02)

(58) Field of Classification Search
CPC . H02J 5/005; H02J 17/00; H02J 50/12; H04B 5/0087; H01Q 9/00; H01Q 11/00; H01Q 1/00; H01Q 3/00; H01Q 5/00; H01Q 7/00; H01F 38/14
USPC .......................................... 320/108; 307/104
See application file for complete search history.

(56) References Cited

U.S. PATENT DOCUMENTS

| | | | |
|---|---|---|---|
| 2001/0000960 | A1 | 5/2001 | Dettloff |
| 2003/0210106 | A1 | 11/2003 | Cheng et al. |
| 2008/0278391 | A1* | 11/2008 | Mayer ................. H01Q 1/2225 343/725 |
| 2010/0052431 | A1* | 3/2010 | Mita ...................... B60L 11/182 307/104 |
| 2012/0248883 | A1* | 10/2012 | Konanur ................. H01F 21/12 307/104 |
| 2014/0085027 | A1* | 3/2014 | Gramegna .............. H01F 21/12 336/143 |
| 2015/0255987 | A1 | 9/2015 | Yang et al. |

FOREIGN PATENT DOCUMENTS

| | | |
|---|---|---|
| EP | 0645840 A1 | 3/1995 |
| JP | H1132452 A | 2/1999 |
| WO | 2009122355 A2 | 10/2009 |
| WO | 2012136303 | 10/2012 |
| WO | 2012150293 A1 | 11/2012 |

OTHER PUBLICATIONS

GB Search Report Issued in related GB Application No. 1512592.5, dated Nov. 10, 2015, 4 Pages.

* cited by examiner

*Primary Examiner* — Drew A Dunn
*Assistant Examiner* — Harry O'neill-Becerril
(74) *Attorney, Agent, or Firm* — Procopio, Cory, Hargreaves & Savitch LLP

(57) ABSTRACT

A wireless charger is disclosed that comprises a transmitter and a resonator connected to the transmitter and comprising a conductive path substantially located within a plane, wherein the conductive path is arranged to form at least two loops, said loops being arranged such that a current that flows in the conductive path flows around a first one of said loops in a first direction and around a second one of said loops in a second direction opposite the first direction.

19 Claims, 7 Drawing Sheets

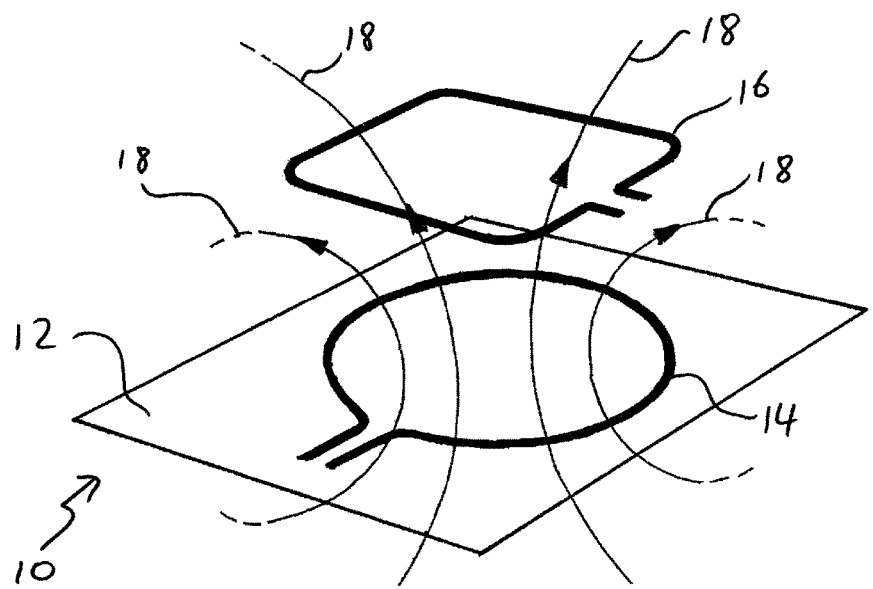
Figure 1 -- Prior art --
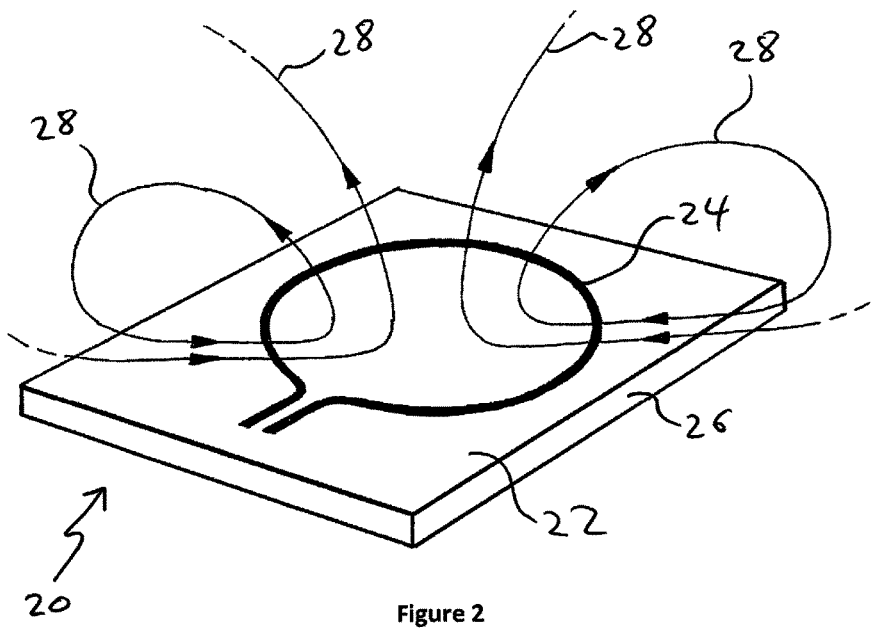
Figure 2

WIRELESS CHARGER WITH RESONATOR

TECHNICAL FIELD

Embodiments of the invention relate to wireless charging of electronic devices, and particularly to resonators used by wireless chargers to transmit a wireless charging signal.

BACKGROUND

Wireless charging offers a convenient way to provide power to electronic devices. A wireless charger transmits a wireless charging signal that is an electromagnetic signal of a certain frequency, and a relatively high power, such as 10 W. Electronic devices can receive the wireless charging signal and extract power therefrom, and use the received power to operate the device and/or charge a battery associated with the device. These actions are referred to herein as "charging" the device. There is no requirement to connect a physical cable between the device and a wireless charger. Each device being charged has an antenna for receiving power transmitted using the wireless charger's antenna, or resonator.

Efficiency of power transfer in wireless charging is affected by several factors. When a device is being charged, its antenna is in proximity to the wireless charger's resonator. Efficiency of power transfer from the charger to the device is affected by how efficiently the charger and device antennas are coupled magnetically. Coupling efficiency depends on what amount of magnetic flux generated by the wireless charger is captured and used by the device being charged. In the ideal case, where all magnetic flux generated by the charger is captured by the device, the ideal efficiency of 100% power transfer would be achieved (not considering other losses, for example resistive losses within the charger or device). In reality, only small fraction of magnetic flux generated by the charger is actually used to excite a current in the device antenna. This is mainly because magnetic flux from the charger is scattered widely in the surrounding space and it is difficult to control its spatial distribution.

FIG. 1 shows an example of a wireless charger 10 including a charging surface 12. The charging surface is substantially planar and contains a resonator 14 that is also substantially planar. Other components of the wireless charger 10, such as transmitting circuitry, controlling circuitry and other components, are not shown. An antenna 16 of a device being charged is shown. When a current is passed through the resonator 14, a magnetic field is produced that is illustrated by magnetic field lines 18. In practice, an alternating current of a certain frequency is passed through the resonator 14 such that the magnitude and direction of the magnetic field changes over time. It can be seen that the antenna 16 captures only a small fraction of the magnetic flux, and a considerable part of the flux is dissipated in the surrounding space.

SUMMARY OF EMBODIMENTS OF THE INVENTION

According to a first aspect of embodiments of the invention, there is provided a wireless charger comprising a transmitter and a resonator connected to the transmitter and comprising a conductive path substantially located within a plane, wherein the conductive path is arranged to form at least two loops, said loops being arranged such that a current that flows in the conductive path flows around a first one of said loops in a first direction and around a second one of said loops in a second direction opposite the first direction.

Thus multiple loops can be provided which control the spatial distribution of the magnetic flux surrounding the wireless charger, thus improving power transfer efficiency between the charger and a device being powered or charged. For example, in some embodiments, the arrangement of the loops encourages the magnetic flux to be more concentrated above a footprint of the wireless charger, that is, the magnetic flux above the footprint of the wireless charger is strengthened, and outside of the footprint it is weakened.

In some embodiments, a first portion of the conductive path comprises the first loop, a second portion of the conductive path comprises the second loop, and at least one of the first and second portions is adjustable. As a result, coupling efficiency between the charger and a device being charged can be adjusted dynamically. For example, the coupling efficiency can be reduced when a device requires less or no power, while in some embodiments coupling efficiency between the charger and a different device can be maintained or increased at the same time. In some embodiments, the conductive path comprises a first section and a second section, and wherein the at least one of the first and second portions is adjustable by selecting points at which the first section is electrically connected to the second section.

In some embodiments, at least one of the loops is larger and/or has more turns than at least one other of the loops. At least one of the loops that is smaller and/or has fewer turns may be located closer to an edge a wireless charging surface containing the conductive path than at least one of the loops that is larger and/or has more turns. With this arrangement, the amount of magnetic flux dissipated in a space surrounding the wireless charger (for example, outside of the charger's footprint) is reduced, and power transfer efficiency to a device being charged is consequently increased.

BRIEF DESCRIPTION OF THE DRAWINGS

Embodiments of the invention will now be described with reference to the accompanying drawings, in which:

FIG. 1 shows a perspective view of a known arrangement of a wireless charging system;

FIG. 2 shows a perspective view of a single-loop wireless charger;

DETAILED DESCRIPTION OF EMBODIMENTS OF THE INVENTION

Stray magnetic flux from a wireless charger that is not captured by a device being charged does not contribute to power transfer between the charger and device. Instead, the stray magnetic flux is attenuated due to magnetic losses in lossy magnetodielectrics surrounding the charger, such as components, casing, metal/ferromagnetic parts and the surface on which the wireless charger is resting. In the ideal case of lossless materials surrounding the charger, the amount of magnetic flux exiting the charger resonator above the charger (direct path) is exactly the same as the amount of flux entering the charger resonator under the charger (return path). Therefore, controlling the return path is may shape and/or focus the overall distribution of magnetic flux.

The direct path between a charger resonator and the antenna of a device being charged is not easily controllable because the antennas may have different footprint, shape or area, and the device's antenna cannot be positioned in the same plane as the device's antenna. In addition, the orientation of antennas may be random. This is particularly the case in some systems where, for example, the wireless charger comprises a planar surface below which a planar resonator is located, and on which a device to be charged may be placed at any position and orientation.

Coupling efficiency between the charger and device may be improved by controlling return path by application of ferrite materials on the underside of the charger, below the resonator. This influences the density of magnetic flux penetrating outside of the volume of the charger, particularly the amount of flux penetrating into the material underneath the charger. With ferrite material having magnetic permeability µ>>1 a substantial amount of returning magnetic flux will be concentrated inside the ferrite layer, reducing losses as the ferrite layer is associated with relatively low losses due to magnetic flux.

FIG. 2 shows an example of a wireless charger 20 having a charging surface 22. The wireless charger 20 includes a resonator 24 and a block of ferrite material 26 underneath the resonator 24. As shown by magnetic field lines 28, the magnetic flux is shaped by the ferrite material 26 such that the return path is substantially contained within the ferrite material 26.

Figure 3:
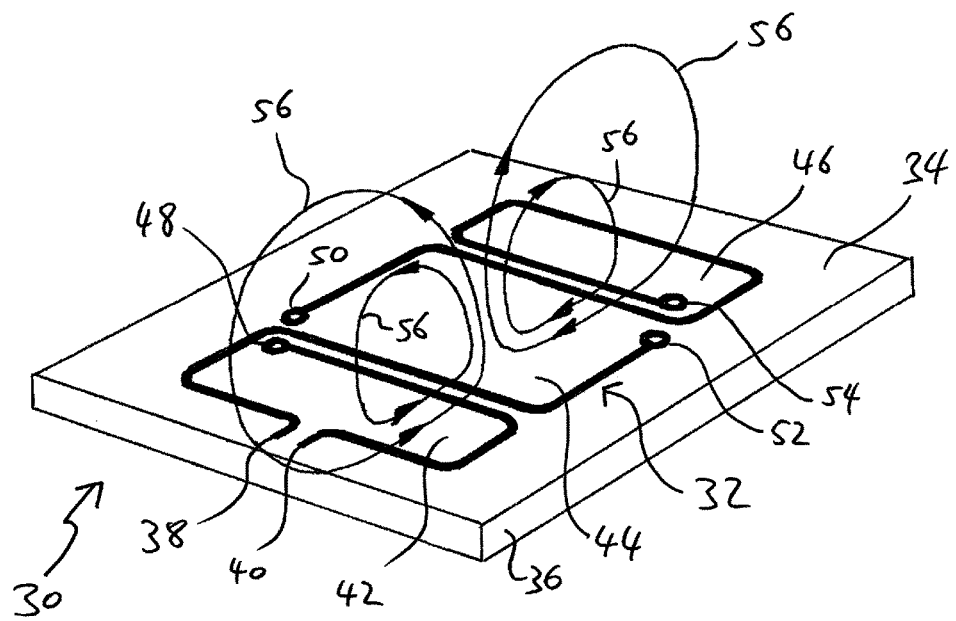
FIG. 3 shows a perspective view of a wireless charger according to an embodiment of the invention.

FIG. 3 shows an example of a wireless charger 30 according to embodiments of the invention. The wireless charger 30 includes an electrically conductive path 32, a substantial part of which is located in a single plane, for example a plane parallel to a charging surface 34. A block of ferrite material 36 is located below the conductive path 32, when the wireless charger is positioned for use, i.e. when the charging surface 34 (the surface on which devices to be charged are placed) is the upper surface of the charger 30.

The conductive path begins at node 38 and ends at node 40 and thus when excited by an electric current from a transmitter (not shown) of the wireless charger 30 acts as a resonator for the charger 30. The conductive path 32 forms three loops 42, 44 and 46. Loop 42 includes a node 48 that is electrically connected to node 50 in loop 44. Similarly, node 52 in loop 44 is electrically connected to node 54 in loop 46. In this way, a continuous electrically conductive path is formed between nodes 38 and 40. Electrical connections between nodes 48 and 50, and between nodes 52 and 54, may be made in a conventional manner including using wires between the nodes or using conductive paths on a different plane than that substantially containing the majority of the conductive path 32.

When an electric current is passed through the conductive path 32 via nodes 38 and 40, the current passes through each of the loops, but does not move around each loop in the same direction. For example, if viewed from above the wireless charger 30, an electric current could traverse the first loop 42 in a clockwise direction, whereas it would traverse loop 44 in an anticlockwise direction, and loop 46 in a clockwise direction. Therefore, the magnetic flux generated by the loops 42 and 46 can be considered as being opposite to that generated by the loop 44.

As a result, the magnetic flux generated by loop 44, which is further from at least some of the edges of the charging surface 34, is encouraged by the flux generated by loops 42 and 46 to be contained within the footprint of the charging surface 34, that is, within a volume of space above and below the charging surface 34 (which is substantially parallel to the plane containing the conductive path 32). Alternatively, as the footprint of the charging surface 34 is in some embodiments slightly larger than the conductive path 32 so that it can cover the path 32, but the charging surface 34 in other embodiments can be unrelated to the size of the conductive path 32, it can be considered that the flux generated by loop 44 is encouraged to be contained within the footprint of the conductive path 44. While not all of the magnetic flux arising from the loop 44 can be contained within either footprint, more of the flux is contained within this footprint compared to a known wireless charger of similar footprint or having a resonator of similar size to loop 44. Therefore, the density of magnetic flux above the loop 44 is increased and the power transfer efficiency between the charger and a device (not shown) that is located for example directly above the loop 44 is increased.

The presence of the ferrite material 36 controls the return path of magnetic flux in a manner similar to that described above with reference to FIG. 2. FIG. 3 shows an example of magnetic field lines 56 generated by the loop 44 when a current is passed through the conductive path 32.

Magnetic flux from loops 42 and 46 can also extend beyond the footprint of the charging surface 34 and/or the conductive path 32 and thus experience losses. However, the size of loops 42 and 46 selected to collect the return flux and concentrate it within the footprint of the wireless charger 30 (or the footprint of the conductive path 32) and therefore the losses may also be reduced compared to an embodiment where the size of all three loops are equal or the size of one or both loops 42 and 44 is increased. Having smaller loops closer to the edges of the footprint of the conductive path 32 and/or charging surface 34 may be useful for reducing losses due to magnetic flux permeating though space outside of the footprint of the charger (or the conductive path 32).

As can be seen in FIG. 3, a loop is not necessarily formed from a single, continuous portion of the conductive path. Instead, each loop may instead comprise non-contiguous portions of the conductive path. This may have advantages in some embodiments in terms of the layout or routing of the conductive path.

Figure 4:
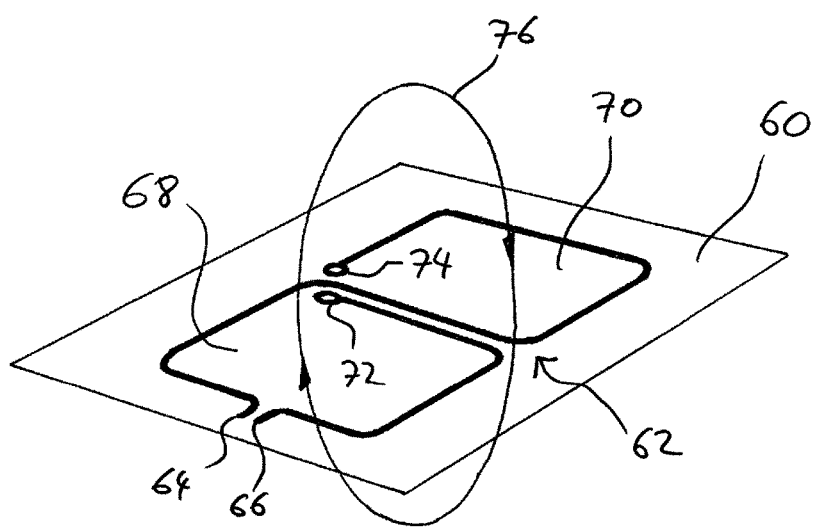
FIG. 4 shows a perspective view of a wireless charger according to another embodiment of the invention.

While the embodiment shown in FIG. 3 has three loops arranges such that loop 44 is adjacent to loops 42 and 46, other embodiments of the invention may have a different number of loops and/or a different spatial arrangement of loops. For example, FIG. 4 shows an example of a wireless charging surface 60 below which a conductive path 62 is located. An electric current may be applied to the conductive path 62 via nodes 64 and 66. The conductive path 62 has two loops 68 and 70. A node 72 in loop 68 is electrically connected to node 74 in loop 70 to ensure a continuous electrically conductive path 62. The loops 68 and 70 generate magnetic flux that is more contained within the footprint of the surface 60 or path 62 compared to a single-loop arrangement of comparable size. A magnetic field line 76 is shown as an example of a magnetic field line generated by the loops 68 and 70.

The embodiment shown in FIG. 3, and indeed other embodiments, may include further components (not shown). For example, transmitting circuitry, receiving circuitry, processing circuitry and/or other components may be included. Embodiments may also include other conductive paths. For example, where a conductive path is shown, this may be for transmitting a wireless charging signal, whereas one or more additional loops (not shown) may be present for receiving signals from other devices, such as those being charged. In each case the receiving loops may take the same form as the transmitting loops or come other form. The additional receiving loop or loops may be electrically isolated from the transmitting loops shown. Receiver loops may not have a current induced in them. Instead, current induced by received communications may be detected by appropriate circuitry in the charger. In further alternative embodiments, however, a single conductive path may be used for both transmitting and receiving.

Figure 5:
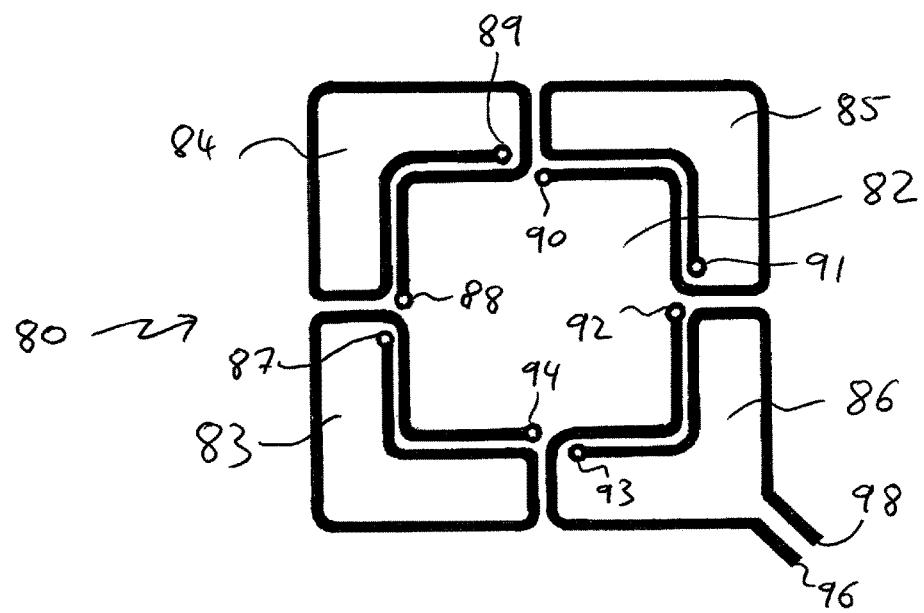
FIG. 5 shows a conductive path according to an embodiment of the invention.

FIG. 5 shows a top view of a conductive path 80 that includes five loops 82-86. To ensure a continuous electrically conductive path, node 87 in loop 83 is connected to node 88 in loop 82, node 89 in loop 84 is connected to node 90 in loop 82, node 91 in loop 85 is connected to node 92 in loop 82, and node 93 in loop 86 is connected to node 94 in loop 82. The conductive path 80 can receive an electric current via nodes 96 and 98. As seen from above, shown in FIG. 5, current passes around loop 82 in a first direction (for example clockwise, or alternatively anticlockwise) while current passes around the other loops 83-86 in a second direction (for example anticlockwise, or alternatively clockwise).

Figure 6:
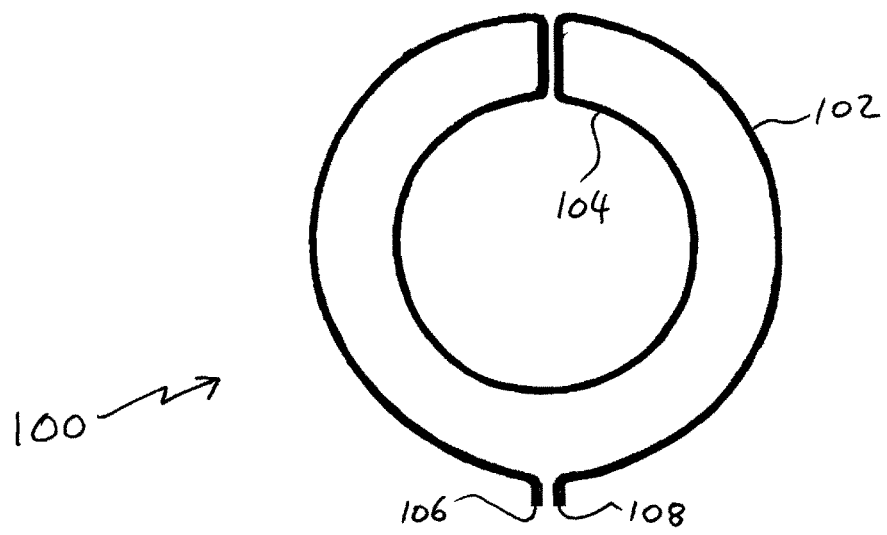
FIG. 6 shows another conductive path according to an embodiment of the invention.

FIG. 6 shows an alternative concentric arrangement of two loops. A conductive path 100 includes an outer loop 102 and an inner loop 104. Current can be supplied via nodes 106 and 108.

Figure 7:
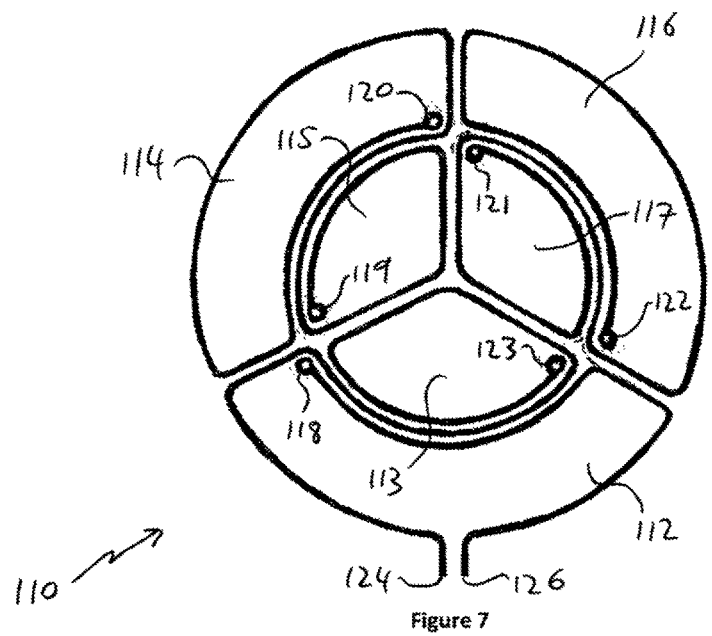
FIG. 7 shows a further conductive path according to an embodiment of the invention.

FIG. 7 shows a further arrangement of a conductive path 110 including six loops 112-117. Node 118 is connected to node 119, node 120 is connected to node 121, and node 122 is connected to node 123. Current can be supplied via nodes 124 and 126.

Figure 8:
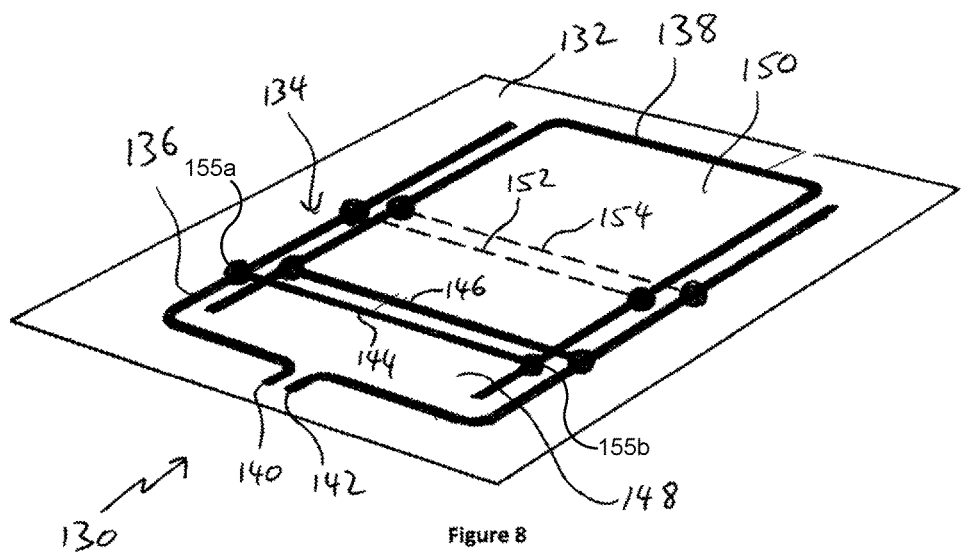
FIG. 8 shows a perspective view of a wireless charger according to another embodiment of the invention.

FIG. 8 shows a wireless charger 130 according to an alternative embodiment of the invention. The charger 130 includes a charging surface 132 below which is located an electrically conductive path 134. The electrically conductive path includes a first section 136 and a second section 138. In this embodiment of the wireless charger 130, the points at which the first section 136 is connected to the second section 138 are adjustable to adjust the portion of the conductive path that comprises each of two loops, and thus adjusts the effective sizes of the loops.

In the example shown in FIG. 8, a current can be supplied to the conductive path 134 via nodes 140 and 142. Thus the first section 136 is effectively split into two parts. Two conductors 144 and 146 connect the first section to the second section. In the configuration shown in FIG. 8, the first conductor 144 connects a first part of the first section 136 to a first point on the second section 138, and the second conductor 146 connects a second part of the first section 136 to a second point on the second section 138. As a result, two loops 148 and 150 are formed, wherein the second loop substantially comprises the conductor 146 and the length of the second section 138 between the first and second points.

In a different configuration, the position of the conductors 144 and 146 may be moved to a different position. An example of new positions 152, 154 for the conductors 144, 146 respectively in the different configuration is shown. In some embodiments, the conductors 144, 146 may be physically moved to the new positions 152, 154, for example using a sliding arrangement or other arrangement, though in other embodiments multiple conductors may be present between various points on each section 136 and 138 of the conductive path 134, each conductor having a series transistor switch 155a, 155b (shown as black circles), for example, and a position for a conductor may be selected by closing the appropriate switch 155.

With the conductors in the new positions 152, 154, the loops 148 and 150 have each changed in size, with the loop 148 becoming larger and the loop 150 becoming smaller. As a result, it is possible to tune the coupling between the conductive path 134 and a device being charged, for example placed on the charging surface 132, if desired. For example, if a device being charged requires more or less power, the sizes of the loops can be changed as described above to adjust the coupling with the device and thus the amount of power being transferred to the device. This is also useful where there are multiple devices being charged and another device requires a different level of power transfer—for example, if one device becomes fully charged and no longer requires high power, and another device is still being charged. The physical arrangement of the first and second sections, conductors and other parts of the charger 130 shown in FIG. 8 are merely examples and can take any appropriate form.

Although the conductive path 134 shown is described as a transmitter resonator, in alternative embodiments the conductive path 134 may instead be a receiver resonator that can be adjusted in a similar manner to improve coupling between the charger and a device, and thus improve communications from the device to the charger.

Figure 9:
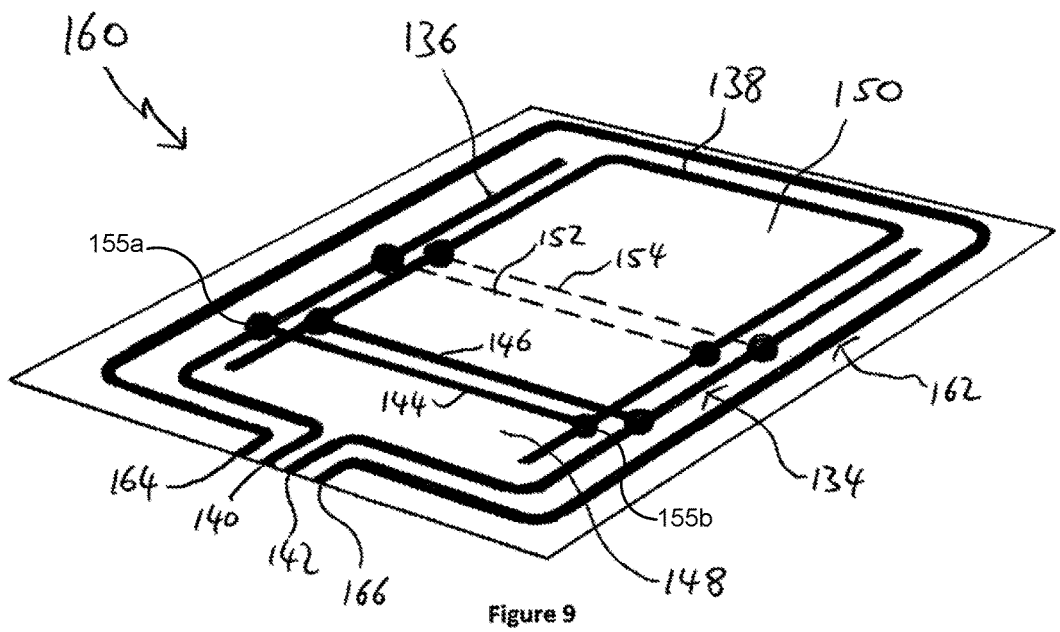
FIG. 9 shows a perspective view of a wireless charger according to a further embodiment of the invention.

The number of loops in a charger and the number of adjustable loops can vary between embodiments. For example, FIG. 9 shows an example of a further embodiment of a wireless charger 160 including two conductive paths 134 and 162. The first conductive path 134 is substantially identical to that shown in FIG. 8 and thus similar features are given the same reference numerals. The second conductive path 162 comprises a single loop to which a current may be supplied via nodes 164 and 166. Though as shown, the two conductive paths are not electrically connected, they may in some embodiments be supplied with the same current, for example by electrically connecting node 164 to one of nodes 140 and 142, and node 166 to the other of nodes 140 and 142. Each of the conductive paths 134 and 162 may in various embodiments be used as a transmitter loop and/or a receiver loop for transmitting a wireless charging signal or other communications to devices, and/or receiving communications from devices.

The embodiment shown in FIG. 9 may be particularly appropriate for devices that include a single loop for receiving a wireless charging signal from a wireless charger. For example, the single loop 162 may be used to reliably receive communications from such devices.

The physical distribution of the conductive paths, number of loops, sizes and shapes, dimensions and other physical attributes are merely examples and the conductive paths may take any appropriate form. Furthermore, any appropriate combination of any of the above embodiments is envisaged. In the above embodiments, where a ferrite material is specified, this could instead be any material with high magnetic permeability.

Figure 10:
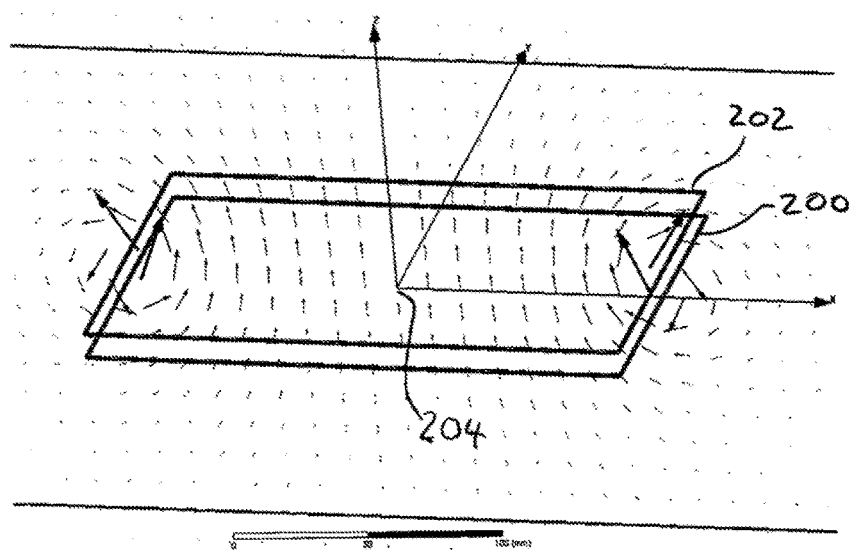
FIG. 10 shows a perspective view of simulated magnetic flux surrounding a known wireless charger.

FIG. 10 shows a simulation of the magnetic flux in a known wireless charger, that has a single loop for transmitting a wireless charging signal (similar to those 10, 20 shown in FIGS. 1 and 2). A single transmitting loop 200 is shown, and a similar shaped receiver loop 202 is shown positioned just above the transmitter loop 200. The loops 200, 202 are shown as complete loops though in practice the loops will have at least one break where a current can be induced (for transmitter loop 200) or detected (for receiver loop 202). During the simulation, a current is induced around the loop 200. Resulting magnetic field lines are represented by arrows in the Figure, with their direction representing the direction of the magnetic field at that point, and their size representing the magnitude of the magnetic field at that point. For clarity, only the magnetic field in a plane including the x and z axes is shown, with the origin at a point 204 approximately at the centre of the loop 200 (that is, the approximate physical centre of the footprint of the loop 200). This plane is also perpendicular to the plane of the loop 200.

As can be seen in FIG. 10, the magnetic flux is strongest closest to the conductive path of the loop 200. Therefore, a significant portion of the magnetic flux falls outside of the footprint of the loop 200.

Figure 11:
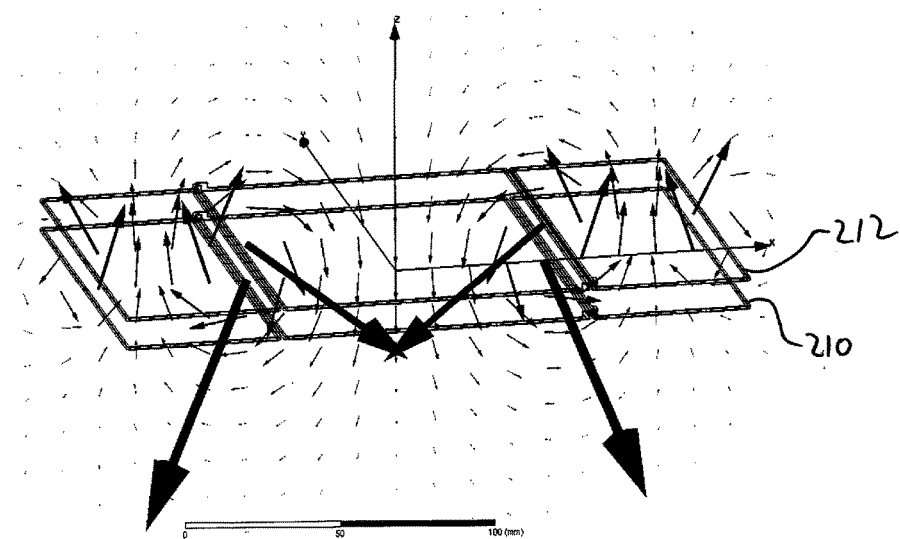
FIG. 11 shows a perspective view of simulated magnetic flux surrounding an embodiment of the invention.

FIG. 11 shows a simulation of the magnetic flux in a wireless charger according to an embodiment, which includes a transmitting conductive path 210 that includes three loops, similar to that shown in FIG. 3, though the simulated embodiment does not include a ferrite slab underneath or adjacent to the wireless charger. A receiver conductive path 212 is also shown. During the simulation, as shown by arrows representing magnetic field lines, the strongest portions of the magnetic field are more concentrated within the footprint of the conductive path 210 compared to the known charger of FIG. 10, though a significant portion extends into the space below the conductive path 210.

Figure 12:
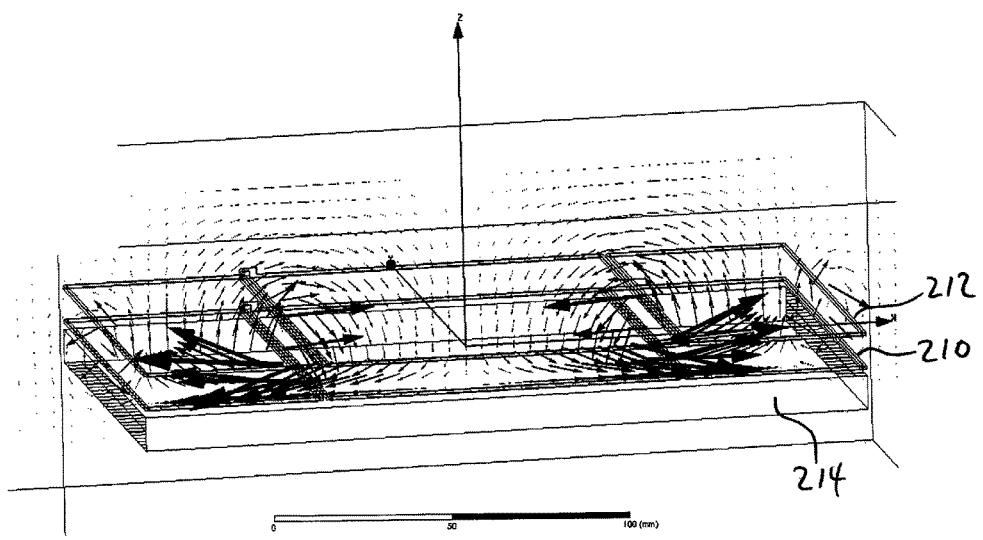
FIG. 12 shows a perspective view of simulated magnetic flux surrounding another embodiment of the invention.

FIG. 12 shows a simulation of a similar embodiment, including a transmitter loop 210 and a receiver loop 212 that are identical to those shown in FIG. 11, but further including a ferrite slab 214 below the transmitter loop 210. The presence of the ferrite slab 214 has the effect of concentrating much of the magnetic flux beneath the transmitter conductive path 210 within itself and thus may reduce losses beneath the wireless charger compared to the embodiment of FIG. 11.

Figure 13:
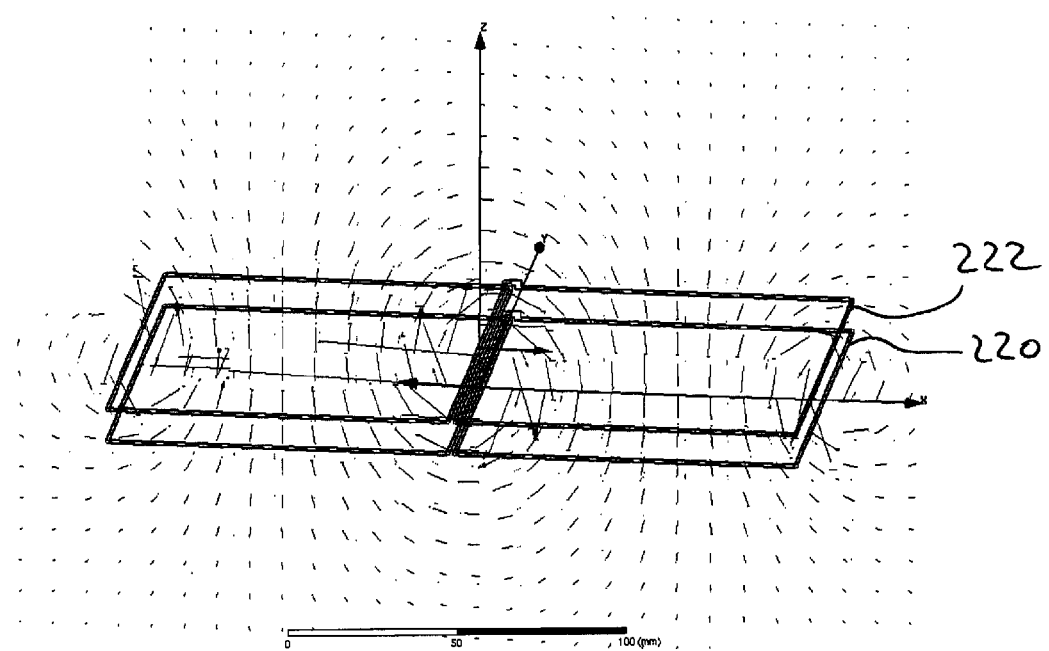
FIG. 13 shows a perspective view of simulated magnetic flux surrounding a further embodiment of the invention.

FIG. 13 shows a simulation of the magnetic flux in a wireless charger according to an embodiment, which includes a transmitting conductive path 220 that includes two loops, similar to that shown in FIG. 4, though the simulated embodiment does not include a ferrite slab underneath or adjacent to the wireless charger. A receiver conductive path 222 is also shown. During the simulation, as shown by arrows representing magnetic field lines, the magnetic field is strongest close to the conductors of the conductive path 220, and thus there are still significant losses close to the edges of the conductive path 220. However, these losses are reduced compared to FIG. 10, as is evidenced by the strong magnetic field close to the centre of the conductive path 220.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." The words "coupled" or "connected", as generally used herein, refer to two or more elements that may be either directly connected or connected by way of one or more intermediate elements. Additionally, the words "herein," "above," "below," and words of similar import, when used in this application, shall refer to this application as a whole and not to any particular portions of this application. Where the context permits, words in the Detailed Description using the singular or plural number may also include the plural or singular number, respectively. The words "or" in reference to a list of two or more items, is intended to cover all of the following interpretations of the word: any of the items in the list, all of the items in the list, and any combination of the items in the list. All numerical values or distances provided herein are intended to include similar values within a measurement error.

Although methods, devices and electronic components have been disclosed in the context of certain preferred embodiments and examples, it will be understood by those skilled in the art that this disclosure extends beyond the specifically disclosed embodiments to other alternative embodiments and/or uses and modifications and equivalents thereof. In addition, while several variations have been shown and described in detail, other modifications, which are within the scope of this disclosure, will be readily apparent to those of skill in the art. It is also contemplated that various combinations or sub-combinations of the specific features and aspects of the embodiments may be made and still fall within the scope of the disclosure. It should be understood that various features and aspects of the disclosed embodiments can be combined with, or substituted for, one another in order to form varying modes of the disclosed embodiments. Thus, it is intended that the scope of the present invention herein disclosed should not be limited to the particular disclosed embodiments described above, but should be determined by a fair reading of the claims that follow.

What is claimed is:

1. A wireless charger comprising:
a transmitter; and
a resonator connected to the transmitter and comprising a first conductive path substantially located within a plane, wherein the first conductive path has a first section and a second section and is arranged to form at least two loops, said at least two loops being arranged such that a current flowing in the first conductive path flows around a first one of said at least two loops in a first direction and around a second one of said at least two loops in a second direction opposite the first direction,
wherein the size of the first one of said loops is adjustable by selecting points at which the first section is electrically coupled to the second section based on a state of one or more transistor switches of the first conductive path, the size of the second one of said loops changes based on the size of the first one of said loops.

2. The wireless charger of claim 1, wherein at least two of the loops are arranged to be adjacent to each other.

3. The wireless charger of claim 1, wherein at least two of the loops are arranged concentrically.

4. The wireless charger of claim 1, wherein the at least two loops comprise at least three loops, at least two of the loops are arranged to be adjacent to each other, and at least two of the loops are arranged concentrically.

5. The wireless charger of claim 1, wherein a first portion of the first conductive path comprises the first one of said loops, a second portion of the first conductive path comprises the second one of said loops, and at least one of the first and second portions is adjustable.

6. The wireless charger of claim 1, wherein the at least two loops comprise at least three loops, wherein a first one of the loops is adjacent to a second one and a third one of the loops, and the first one of said loops is larger and/or includes more turns than the second one of said loops and/or the third one of said loops.

7. The wireless charger of claim 1, wherein at least one of the loops is larger and/or has more turns than at least one other of the loops.

8. The wireless charger of claim 7, wherein at least one of the loops that is smaller and/or has fewer turns is located closer to an edge a wireless charging surface containing the first conductive path than at least one of the loops that is larger and/or has more turns.

9. The wireless charger of claim 1, wherein the size of the second one of said loops adjusts inversely with the size of the first one of said loops.

10. The wireless charger of claim 1, wherein the first section of the first conductive path comprises a first path segment coupled to a first end of the first conductive path and a second path segment coupled to a second end of the first conductive path, and wherein the second path segment is parallel to the first path segment.

11. The wireless charger of claim 10, wherein the second section of the first conductive path comprises a third path segment parallel to the first path segment and a forth path segment parallel to the second path segment, and wherein the third path segment is coupled in series with the fourth path segment.

12. The wireless charger of claim 1, wherein the points at which the first section is electrically connected to the second section are selected using a sliding arrangement.

13. The wireless charger of claim 1, wherein the points at which the first section is electrically connected to the second section are selected using at least one transistor switch.

14. The wireless charger of claim 1, further comprising a second conductive path substantially located within the plane.

15. The wireless charger of claim 14, wherein the second conductive path is arranged to carry the same current as the first conductive path.

16. The wireless charger of claim 14, wherein the second conductive path is arranged for communications with a device being changed by the wireless charger.

17. The wireless charger of claim 14, wherein the second conductive path is arranged for receiving communications from a device being changed by the wireless charger.

18. The wireless charger of claim 14, wherein the second conductive path is located outside the first conductive path.

19. The wireless charger of claim 1, wherein the size of the first one of said loops is adjusted to tune coupling between the conductive path and a device being changed by the wireless charger.

* * * * *